United States Patent
Makoto

(10) Patent No.: US 7,119,311 B2
(45) Date of Patent: Oct. 10, 2006

(54) INDUCTION CIRCUIT FOR CONTACTLESS POWER SUPPLY APPARATUS

(75) Inventor: Nunoya Makoto, Aichi (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/004,378

(22) Filed: Dec. 3, 2004

(65) Prior Publication Data

US 2005/0133497 A1    Jun. 23, 2005

(30) Foreign Application Priority Data

Dec. 5, 2003    (JP) .............................. 2003-406615

(51) Int. Cl.
*H05B 6/04*    (2006.01)
(52) U.S. Cl. ....................... 219/661; 219/663
(58) Field of Classification Search ................ 219/661, 219/663, 664, 668; 363/49–50, 52, 84, 89; H02M 3/28; H01F 38/14; H02J 1/00, 17/00
See application file for complete search history.

(56) References Cited

FOREIGN PATENT DOCUMENTS

JP    09214394 A  *  8/1997
JP    11252912 A  *  9/1999

* cited by examiner

*Primary Examiner*—Quang Van
(74) *Attorney, Agent, or Firm*—Thomas, Kayden, Horstemeyer & Risley

(57) ABSTRACT

An induction circuit for a contactless power supply apparatus including an induction coil for inducing a current in response to a high frequency current flowing through a primary induction circuit and supplying the current to a load. The induction circuit includes a resonant capacitor, a full-wave rectifier, two short-circuited units, a current-limiting coil, and a smoothing capacitor. The current is rectified by the full-wave rectifier via the current-limiting coil to supply the load. The output voltage level and the voltage levels of the short-circuited units are monitored to control the resonance of resonant circuit which is formed by induction coil and resonant capacitor to stop by turning on any of the short-circuited units. Hence, an impulse current is prevented from entering the load and damaging the induction circuit.

3 Claims, 3 Drawing Sheets

INDUCTION CIRCUIT FOR CONTACTLESS POWER SUPPLY APPARATUS

BACKGROUND

The invention relates to an induction circuit for a contactless power supply apparatus.

Please refer to FIG. 1, which illustrates a related art induction circuit for a contactless power supply apparatus as disclosed in JP. Pat. No. 11-252912. In this related art induction circuit, a secondary induction circuit comprises an induction coil 92 for inducing a current in response to a high frequency current flowing through a primary induction circuit 91. The induction coil 92 is coupled to a resonant capacitor 93 to form a resonant circuit wherein the resonant circuit has a resonant frequency the same as the frequency of the high frequency current in the primary induction circuit 91. The resonant capacitor 93 is connected to a full-wave rectifier 94 wherein the full-wave rectifier 94 is coupled to a constant-voltage control circuit 95 which controls an output voltage according to a reference voltage. A load 96 is coupled to the constant-voltage control circuit 95 and supplied power thereby. The two diodes 94A and 94B in the full-wave rectifier are connected to the short-circuited transistors 921A and 921B respectively.

A current-limiting coil 97 is coupled between cathodes of the two diodes 94C and 94D, and an adjusting transistor 910 coupled to the outputs of the full-wave rectifier 94. The constant-voltage control circuit 95 further comprises a comparator 99 and a timer 922, wherein the comparator 99 compares the output and reference voltages $V_{ref}$ and generates a first output signal to timer 922 and an AND circuit 923 according to the comparison result. The timer 922 starts to count in response to the first output signal and generates a second output signal to the AND circuit 923. Thus the AND circuit 923 controls the adjusting transistor 910 in accordance with the first and second output signals.

The operation of the induction circuit is described in the following. When the load 96 is reduced and the output voltage $V_{DC}$ rises, the comparator 99 generates the first output signal to turn on the adjusting transistor 910. Meanwhile, the first output signal turns on the timer 922. Timer 922 then generates the second output signal for turning on the short-circuited transistors 921A and 921B and turning off the adjusting transistor 910 after a predetermined time. When the adjusting transistor 910 is turned on, the output voltage $V_{DC}$ is held at the reference voltage level $v_{ref}$. Furthermore, the energy accumulated in the resonant capacitor is accumulated in the current-limiting coil 97. When the short-circuited transistors 921A and 921B are turned on and the adjusting transistors 910 are turned off, the energy in the current-limiting coil 97 is output to the load 96 to be used effectively, thus reducing power loss.

The excessive output voltage $V_{DC}$, however, may be reduced to the reference voltage level $v_{ref}$ by the constant-voltage control circuit 95 when the adjusting transistor 910 in the constant-voltage control circuit 95 is turned on and the charges accumulated in the resonant capacitor flow into the adjusting transistor 910 via the current-limiting coil 97. This impulse current may damage the adjusting transistor 910 and heat the current-limiting coil 910 at a high speed, causing heat loss. The sizes of the current-limiting coil 97 and the adjusting transistor 910 are also limited due to the mentioned impulse current. In addition, there is a problem of complexity of the short-circuited transistor 921A and 921B, and the adjusting transistor 910 in the related art.

In view of the above, the objective of the invention is to provide an induction circuit for a contactless power supply apparatus to prevent transistors from damage when an impulse current is generated, reduce the heat loss of coils and minimize the size of components.

SUMMARY

An induction circuit for a contactless power supply apparatus including an induction coil for inducing a current in response to a high frequency current flowing through a primary induction circuit to transfer the inductive energy of the primary induction circuit to a load, the induction circuit comprises a resonant capacitor, a full-wave rectifier, two short-circuited units, a current-limiting coil, and a smoothing capacitor. The resonant capacitor is coupled in parallel with the induction coil and forms a resonant circuit with the induction coil, wherein the resonant circuit has a resonant frequency the same as the frequency of the high frequency current in the primary induction circuit. The full-wave rectifier comprises four diodes wherein two of the diodes have coupled cathodes and the other two diodes have coupled anodes. The full-wave rectifier rectifies an alternating current (AC) generated by the resonant circuit and supplies the AC current to the load. The two short-circuited units are coupled in parallel respectively to the two diodes which have coupled cathodes in the full-wave rectifier. The current-limiting coil is coupled between the output of the full-wave rectifier and the load. The smoothing capacitor is coupled between the current-limiting coil and the load, but coupled in parallel with the load. The resonance of the resonant circuit stops when any of the short-circuited units is turned on.

DESCRIPTION OF THE DRAWINGS

The present invention will be described by way of exemplary embodiments, but not limitations, illustrated in the accompanying drawings in which like references denote similar elements, and in which.

DETAILED DESCRIPTION

Figure 1:
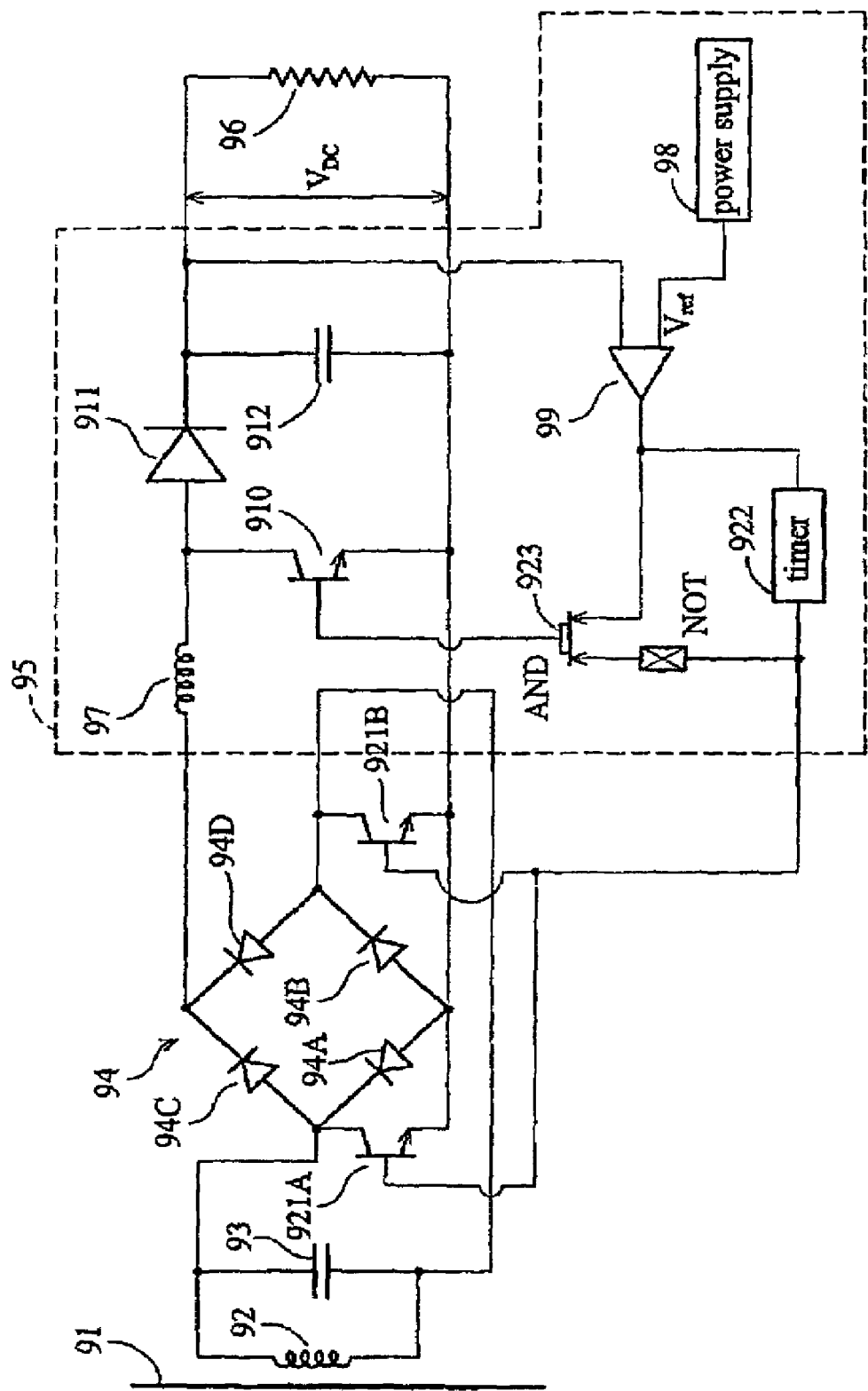
FIG. 1 is a schematic diagram of a related art induction circuit for a contactless power supply apparatus.
Figure 2:
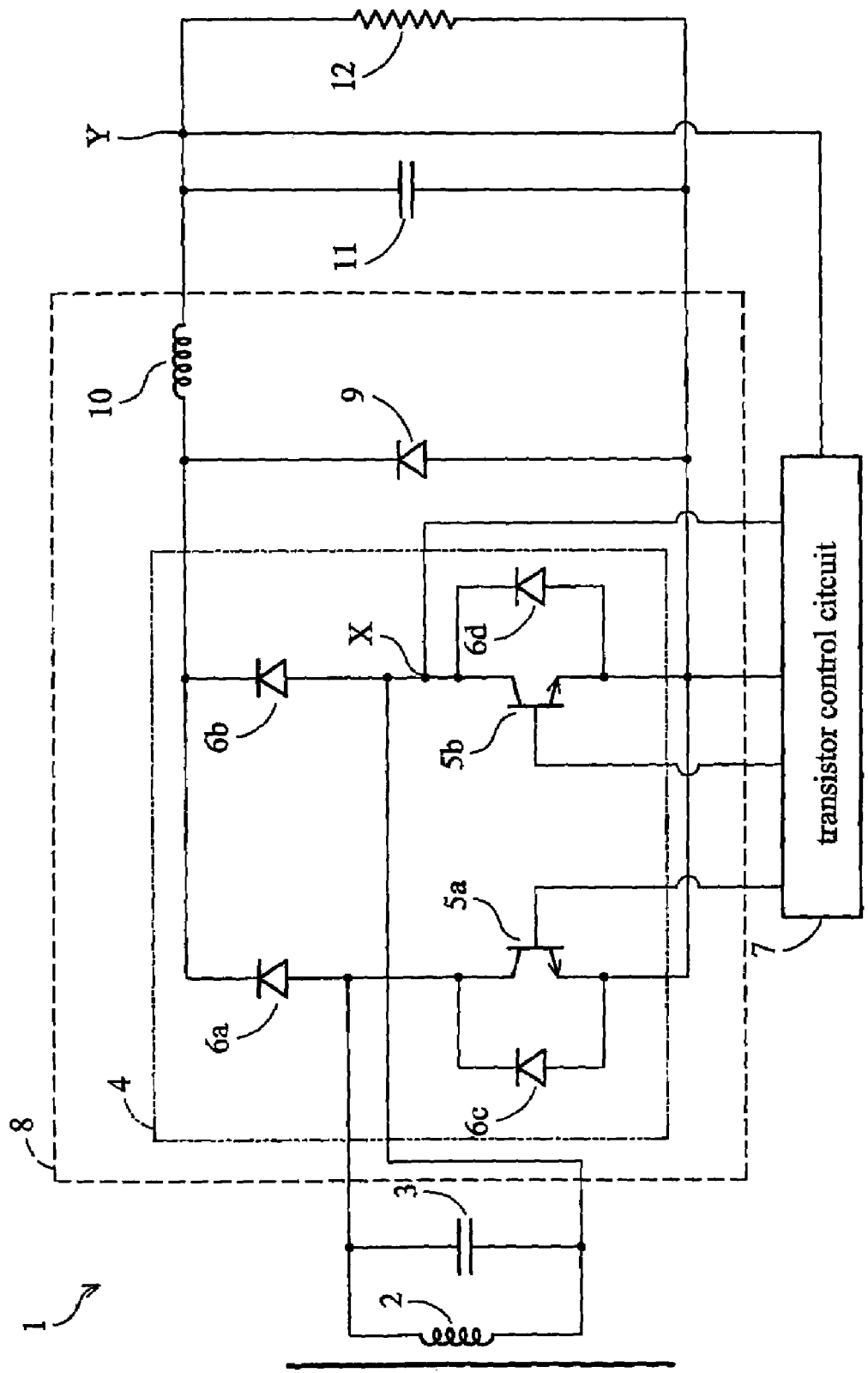
FIG. 2 is a schematic diagram of an induction circuit for a contactless power supply apparatus according to an embodiment of the invention.

With reference to FIG. 2, an induction circuit 1 for a contactless power supply apparatus of the invention is provided to induce a current in response to a high frequency current flowing through a primary induction circuit to transfer the inductive energy of the primary induction circuit to a load 12. The induction circuit 1 comprises an induction coil 2, a resonant capacitor 3, a full-wave rectifier 4, transistors 5, a rectifying diode 9, a current-limiting coil 10, a smoothing capacitor 11 and the load 12. The induction coil 2 is placed in a magnetic field having a constant frequency such as 10 KHz to induce an induction current. The resonant capacitor 3 is coupled in parallel to the induction coil 2, forming a resonant circuit with the induction coil 2 and the resonant circuit has a resonant frequency the same as the frequency of the magnetic field. The full-wave rectifier 4 comprises 4 didoes (6a, 6b, 6c, 6d) and rectifies the AC power from the resonant circuit to supply the load 12. Transistors 5a and 5b are coupled in parallel to the respective diodes 6c and 6d of the full-wave rectifier 4. The rectifying diode 9 is coupled to the output of the full-wave rectifier 4. The current-limiting coil 10 (DC coil) is coupled between the load 12 and the connecting node between the cathode of the rectifying diode 9 and the output of the full-wave rectifier 4. The smoothing capacitor 11 is coupled in parallel with the load 12 and coupled between the current-limiting coil 10 and the load 12. The full-wave rectifier 4, transistors 5 (5a, 5b), the rectifying diode 9 and the current-limiting coil 10 form a direct-current (DC) constant voltage circuit 8. Moreover, the full-wave rectifier 4 is a bridge rectifier formed by the four diodes 6a, 6b, 6c and 6d.

Transistor 5a includes a collector coupled to the cathode of the diode 6c and an emitter coupled to the anode of the diode 6c while transistor 5b includes a collector coupled to the cathode of the diode 6d and an emitter coupled to the anode of the diode 6d. For the diodes 6, if current is flowing from the anode to the cathode, a diode of this type is referred to as forward-biased.

Moreover, the transistor control circuit 7 controls the transistors 5a and 5b by monitoring the voltage level of the collector of transistor 5b at node X and the output voltage level at node Y. The transistor control circuit 7 turns on one of the transistors 5a and 5b according to the bias condition of the diodes 6c and 6d to stop the resonance of the resonant circuit. For example, when diode 6c is forward biased, transistor 5a is turned on, thus resonance of the resonant circuit stops. In other words, transistor 5b is turned on when diode 6d is forward biased.

The operation of the induction circuit 1 is described in the following. When a high frequency current with a frequency, for example, 10K Hz, is supplied to the primary induction circuit, the induction coil 2 induces an AC current. The full-wave rectifier 4 rectifies the AC power to supply to the load 12 via the current-limiting coil 10 and charge the smoothing capacitor 11.

Figure 3:
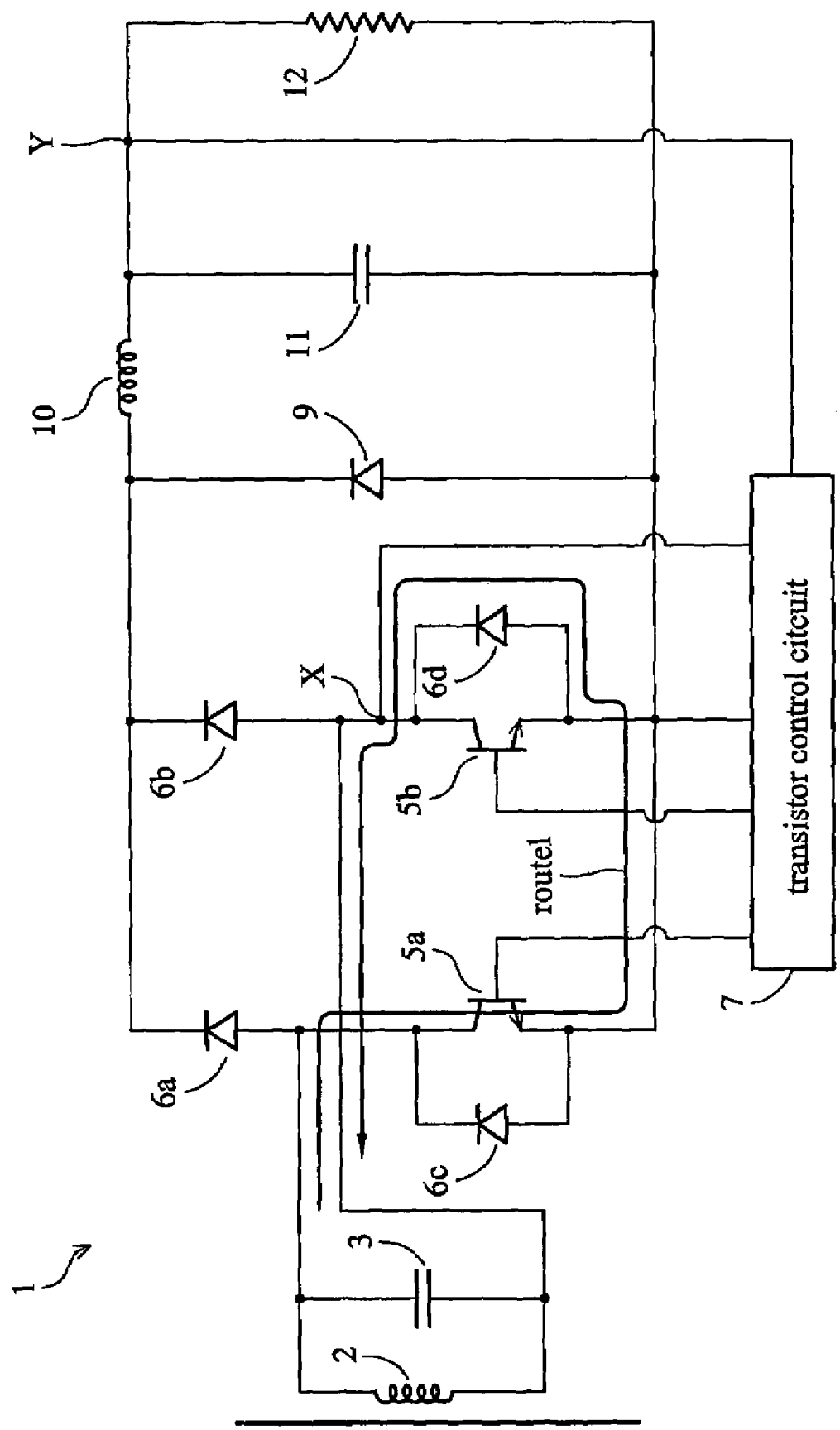
FIG. 3 is a schematic diagram of illustrating an embodiment of an induction circuit when the resonance of the resonant circuit stops.

When the load 12 is reduced and the output voltage level is higher than the reference voltage level, the resonance of the resonant circuit is controlled to stop. That is done by transistor control circuit 7 to turn on transistor 5a when diode 6c is forward biased. The voltage level on the collector of transistor 5a increases from negative value to positive value after at least half a cycle. The diode 6c then becomes reverse biased. As the route 1 shown in FIG. 3, the current flows through the resonant circuit, transistor 5a, diode 6d and the resonant circuit in turn. Consequently, the impulse current is prevented from flowing through transistor 5b and current-limiting coil 10 and the resonance of the resonant circuit stops. The current-limiting coil 10 then supplies the accumulated energy via the smoothing capacitor 11 to the load 12.

When the load 12 is increased to a normal condition, and the output voltage level is lower than the reference voltage level, the transistor control circuit 7 turns off the transistor 5a (i.e. transistor 5a is open-circuited) allowing the resonant circuit to start resonating again.

From the previous description, it is clear that preventing an impulse current from flowing to current-limiting coil 10 can minimize the component size. In addition, the accumulated energy in resonant capacitor 3 will not flow into transistors 5 and current-limiting coil 10 prematurely, thus preventing damage to the transistors 5 and reducing the heat loss of the current-limiting coil 10. Those skilled in the art will be familiar with various ways of implementing the invention with semiconductor components such as transistors, thyristors or combinations thereof. The invention is further served by replacing the transistors 5 by thyristors. Furthermore, it is known that one of the transistors 5 is turned on when the respective diode in the full-wave rectifier 4 is forward biased. The other transistor, however, can also be turned on after a short time.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An induction circuit for a contactless power supply apparatus including an induction coil for inducing a current in response to a high frequency current flowing through a primary induction circuit to transfer the inductive energy of the primary induction circuit to a load, the induction circuit comprising:
    a resonant capacitor coupled in parallel with the induction coil, forming a resonant circuit with the induction coil, wherein the resonant circuit has a resonant frequency the same as the frequency of the high frequency current in the primary induction circuit;
    a full-wave rectifier comprising four diodes wherein two of the diodes have coupled cathodes and the other two diodes have coupled anodes, for rectifying an alternating current(AC) generated by the resonant circuit and supplying the AC current to the load;
    two short-circuited units coupled in parallel to the two diodes which have coupled cathodes in the full-wave rectifier respectively;
    a current-limiting coil coupled between the output of the full-wave rectifier and the load; and
    a smoothing capacitor coupled in parallel with the load and coupled between the current-limiting coil and the load;
    wherein the resonance of the resonant circuit stops when only one of the short-circuited units is turned on.

2. The induction circuit according to claim 1, wherein the voltage levels of the short-circuited units are monitored and one of the two short-circuited units is turned on when the respective diode is forward biased.

3. The induction circuit according to claim 2, wherein the short-circuited units are semiconductor components.

* * * * *